R. H. NEWMAN.
FRUIT KNIFE.
APPLICATION FILED JAN. 12, 1918.

1,261,954.

Patented Apr. 9, 1918.

Witnesses:

Inventor
Rutledge H. Newman
By Williams Bradbury
Attys.

UNITED STATES PATENT OFFICE.

RUTLEDGE H. NEWMAN, OF CHICAGO, ILLINOIS.

FRUIT-KNIFE.

1,261,954.  Specification of Letters Patent.  Patented Apr. 9, 1918.

Application filed January 12, 1918. Serial No. 211,475.

*To all whom it may concern:*

Be it known that I, RUTLEDGE H. NEWMAN, a citizen of the United States, residing at Chicago, in the county of Cook and State of Illinois, have invented a certain new and useful Improvement in Fruit-Knives, of which the following is a full, clear, concise, and exact decription, reference being had to the accompanying drawings, forming a part of this specification.

My invention relates to improvements in fruit knives, and is especially concerned with a knife for removing non-edible portions comprising the partitions and cores of grapefruits, oranges, or other citrous fruits. The objects of my invention are to provide an improved form of knife over that shown in my Patent No. 1,226,797, May 22, 1917, the objects being to provide a knife which is simpler in construction and operation, cheaper to manufacture and easier to clean. Further objects will appear as the description progresses.

My improved form of knife comprises a knife blade the free end of which is curved and provided with a cross blade extending from the curved edge of the free end, the said cross blade having front, rear and side cutting edges. The rear cutting edge is inclined rearwardly from the blade and the side cutting edge is inclined forwardly toward the end of the blade, thereby forming a sharpened point which can be used for penetrating the partitions at a point adjacent the end of the core and the rind to place the blade and the cross blade in proper position relative to the partitions to sever the same from the rind when the knife is drawn outwardly from the core along the inner side of the rind. This movement severs the partition from the pulp adjacent one side thereof. The knife is then again inserted adjacent the core of the fruit, but on the opposite side of the partition, thereby separating the partition from the pulp at this side of the partition, the cross blade serving as a sort of a guide and means for preventing the end of the knife from passing through the rind. The front cutting edge of the cross blade is used for severing the core from the rind, this result being accomplished by pushing the knife forwardly against the end of the core prior to the separation of each of the partitions from the fruit pulp. The construction of my improved knife will be understood from the following description taken in connection with the accompanying drawings, wherein—

Similar characters of reference refer to similar parts throughout the several views.

Figure 3:
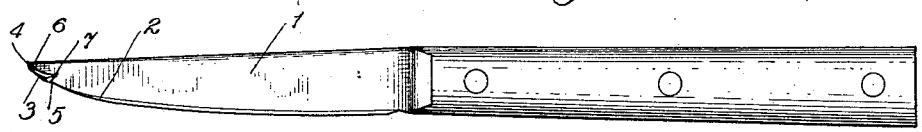
Fig. 3 is a side elevation.
Figure 4:
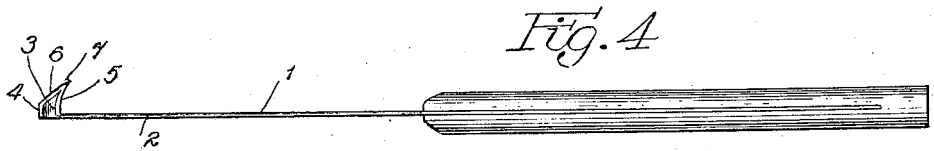
Fig. 4 is a bottom view of the knife looking toward the sharpened edge thereof.

The reference character 1 indicates the blade of the knife, which is similar in contour to an ordinary paring knife, the free end of the knife being provided with a curved cutting edge 2. Secured to the end of the curved cutting edge 2 and extending therefrom in a plane substantially tangent to the curved edge 2 and substantially at right angles to the plane of the blade 1 is the cross blade 3 having the front, rear and side cutting edges 4, 5 and 6 respectively. The rear cutting edge, as shown in Figs. 3 and 4, is inclined outwardly from the blade 1. The purpose of this construction is to provide means for guiding or urging the partition inwardly toward the blade 1, so that this blade will separate the partition from the pulp without leaving any of the pulp upon the partition. The side cutting edge 6 is inclined forwardly toward the blade 1, thereby forming with the rear cutting edge 6 a sharpened point 7.

Figure 1:
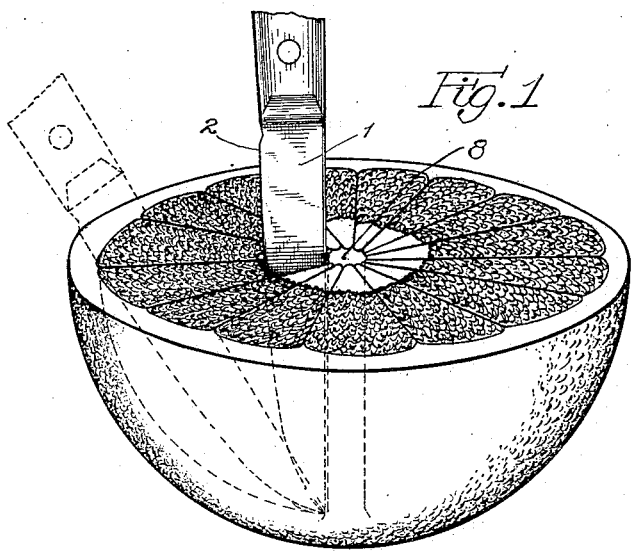
Figure 1 is a perspective view of one-half of a grapefruit or other citrous fruit showing in full lines the position in which the knife is first inserted in the fruit, and in dotted lines the position which the knife occupies relative to the fruit when severing the partitions from the rind.
Figure 2:
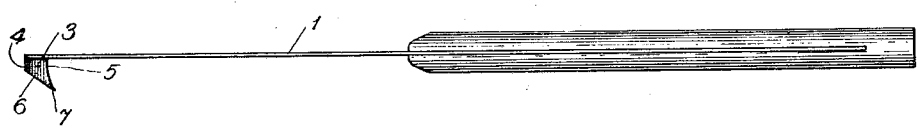
Fig. 2 is a plan view of the knife looking toward the back edge thereof.

In operation the knife is inserted as shown in full lines in Fig. 1, and then tipped laterally to the position shown in dotted lines. By a forward movement of the knife the cutting edge 4 is caused to sever a portion of the core 8 of the fruit from the rind. The front end of the blade is then given a slight lateral movement to cause the point 7 to pass through the adjacent partition. The knife is then drawn outwardly with the outer side of the cross blade 3 in contact with the rind of the fruit. This operation severs one side of the partition from the adjacent fruit pulp. The knife is then again inserted adjacent the core but on the opposite side of the partition, and is then again drawn toward the outer edge of the rind to part the partition from the adjacent fruit pulp.

Having thus described my invention, and the method of using the same, what I claim as new and desire to secure by Letters Patent of the United States is:

1. A knife blade having a free end with a curved cutting edge in combination with a cross blade extending substantially tangent to the curved edge and at right angles to the plane of said blade, said cross blade having front, rear and side cutting edges, the rear cutting edge being inclined rearwardly from the blade and the side cutting edge being inclined forwardly toward the blade.

2. A knife blade having a free end with a curved cutting edge in combination with a cross blade secured at one edge to said curved edge and extending at substantially right angles to the plane of said blade and having rear and side cutting edges, the rear cutting edge being inclined rearwardly from the blade and the side cutting edge being inclined forwardly toward the end of the blade to form a partition penetrating point.

3. A knife blade having a free end with a curved cutting edge in combination with a cross blade secured at one edge to said curved edge and extending at substantially right angles to the plane of said blade and having rear and side cutting edges, the rear cutting edge being inclined rearwardly from the blade.

4. A knife blade having a cross blade secured adjacent the free end thereof and lying in a plane extending at substantially right angles to the plane of said blade and inclined rearwardly from one edge of said blade, the said cross blade having rear and side cutting edges.

5. A knife blade having a cross blade secured adjacent the free end thereof and lying in a plane extending at substantially right angles to the plane of said blade and inclined rearwardly from one edge of said blade, the said cross blade having a rear cutting edge inclined rearwardly from the blade and meeting the edge of said blade.

In witness whereof, I hereunto subscribe my name this 4th day of January, 1918.

RUTLEDGE H. NEWMAN.

Witnesses:
 ALBIN C. AHLBERG,
 LAMAR MIDDLETON.

Copies of this patent may be obtained for five cents each, by addressing the "Commissioner of Patents, Washington, D. C."